United States Patent [19]

Schultz

[11] 4,178,692
[45] Dec. 18, 1979

[54] MEASURING DEVICE FOR CHECKING THE DIMENSIONAL ACCURACY OF THE TRACK WIDTH OF CURVED TRANSPORT TRACKS, PARTICULARLY FOR CONTINUOUS CASTING OR EXTRUSION

[75] Inventor: Helmut Schultz, Dortmund, Fed. Rep. of Germany

[73] Assignee: Hoesch Werke Aktiengesellschaft, Dortmund, Fed. Rep. of Germany

[21] Appl. No.: 788,370

[22] Filed: Apr. 18, 1977

[30] Foreign Application Priority Data

Apr. 17, 1976 [DE] Fed. Rep. of Germany ....... 2617143

[51] Int. Cl.² ........................... G01B 5/14; G01B 3/46
[52] U.S. Cl. .................................... 33/182; 33/143 L; 33/147 K
[58] Field of Search ..................... 33/182, 175, 143 R, 33/143 L, 304, 313, 338, 178 E, 178 F, 147 K, 147 N, 174 H, DIG.7, 168 B, 174 R; 72/35; 73/141 A

[56] References Cited

U.S. PATENT DOCUMENTS 3,780,442  12/1973  Gresho ............................. 33/178 E
3,939,568  2/1976   Gonos .............................. 33/147 K
3,983,631  10/1976  Dutzuer ........................... 33/147 K Primary Examiner—Willis Little
Attorney, Agent, or Firm—Max Fogiel

[57] ABSTRACT

A measuring device for checking the dimensional accuracy of the track width of curved transport tracks formed by paired rollers lying on a radius of curvature equidistantly be placed into a transport track and moved therealong, is provided with at least two displacement sensors. The sensors are spaced apart at a distance determined by the track width. The carrier for the displacement centers has contours corresponding substantially to the curvature of the transport track. The carrier has a length which ensures, when inserted in the transport track, the continuous spanning of at least two successive roller pairs. The displacement sensors are located on a radius of the circle of curvature of the track. The height of the carrier corresponds substantially to the track width, and the sensors are of the non-contact type. The carrier may be coated with elastically resilient material on those surface portions subjected to reciprocal action with the rollers.

9 Claims, 3 Drawing Figures

MEASURING DEVICE FOR CHECKING THE DIMENSIONAL ACCURACY OF THE TRACK WIDTH OF CURVED TRANSPORT TRACKS, PARTICULARLY FOR CONTINUOUS CASTING OR EXTRUSION

BACKGROUND OF THE INVENTION

The present invention relates to a measuring device for checking the dimensional accuracy of the track width of curved transport tracks formed by paired rollers lying on a radius of curvature equidistantly from each other. A carrier (bar) arrangemnt can be placed into the transport track and moved along in the transport track with at least two displacement pickups in the bar arrangement spaced apart at a distance determined by the given track width.

Transport tracks described here are components of continuous casting or extrusion installations.

To achieve high-quality semi-finished products and in the long run, high-quality finished products, a clearly defined track width of the roller sets constituting the transport track, identical dimensions of the track width between successive roller sets, and the maintenance of the initial track width are very important.

The maintenance of the specified track width during operation requires continuous monitoring of the transport track.

Previously, monitoring was carried out mainly by means of patterns, calipers or feeler gages under difficult operating conditions such as restricted space, heavy dirt and at high temperatures; dimension checking and the evaluation of the values obtained were time consuming.

There is already known a measuring arrangement of the initially described type for continuous casting or extrusion installations where two scanning displacement pickups or sensors associated with a chain segment of the cold extrusion track, measure the distance between the rollers of each roller set and where the transmitted measured values are evaluated.

This measuring arrangement which uses a straight chain segment as carrier for the displacement pickups does not take into consideration the curvature of the transport track. This results in measuring errors which are unacceptable in view of the high requirements on the accuracy to size of the track width.

It is, therefore, an object of the present invention to provide a measuring device which ensures perfect checking of the dimensional accuracy to size of the track width of curved constant-radius transport tracks formed by rollers located in pairs on a radius of curvature.

Another object of the present invention is to provide a measuring device of the foregoing character which is substantially simple in construction and may be economically fabricated.

A further object of the present invention is to provide a measuring device, as described, which may be readily maintained in service, and which has a substantially long operating life.

SUMMARY OF THE INVENTION

The objects of the present invention are achieved by providing that the contours of the bar for the displacement pickups, at least approximately, correspond to the curvature of the transport track; this bar has a length ensuring, when inserted in the transport track, the continuous spanning of at least two successive roller sets; the displacement pickups are located on one radius of the circle of curvature.

With a circular curvature of the transport track, the bars for the displacement pickups or sensors have the associate circular arc shape. If the transport track curvature differs from a circular arc, for example, with an elliptical curvature, one selects a form of curve for the bar which, on the one hand, ensures the unimpaired travel of the measuring device through the transport track and, on the other hand, minimizes the measuring errors occuring with straight bars.

The construction in accordance with the present invention ensures a perfect measuring of the track width of such curved transport tracks.

A preferred embodiment uses contactless displacement pickups where the carrier has a height corresponding to the track width.

The forced guidance of the bar, resulting from constructing the bar in accordance with the track width, contributes to the measuring accuracy. Contactless displacement pickups are shorter; therefore, they can be aligned even with small track widths and are not subject to wear, thus eliminating additional sources of error.

It is expedient that the height of the bar, designed for the track width, can be reduced, within limits, since a shifting (displacement) of the rollers so as to reduce the track width is definitely possible. With a bar (carrier) of constant height, this would lead to damage to the measuring device.

With carriers with an elastic coating, a slight addition to the height can be provided so that the measuring device travels through the transport track under an initial stress securing its position in the transport track.

A number of adjacent displacement pickup pairs, a distance apart, in addition to measuring the track width, makes it possible to measure the axial position and the camber of the rollers.

With another embodiment of the present invention, the carrier has at least one inclinometer. This makes it possible to monitor (check) the roller position on the circle of curvature and, in particular, the position of the transport track segments in which a number of roller pairs is combined. Such a measuring device can also determine if the rollers are out of round (out of true).

If the measuring device has a number of adjacent inclinometers at a distance apart, the inclinometers can also be used for checking the axial position of the rollers.

A preferred embodiment provides separate inclinometer carriers with independently movable surface portions which engage in reciprocal action with the facing rollers of transport track and have, when inserted in the transport track under initial tension, a length ensuring continuous spanning of two and only two successive roller sets; inclinometers are mounted on these surface portions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWNGS

DESCRIPTION OF THE PREFERRED EMBODIMENTS

Figure 1:
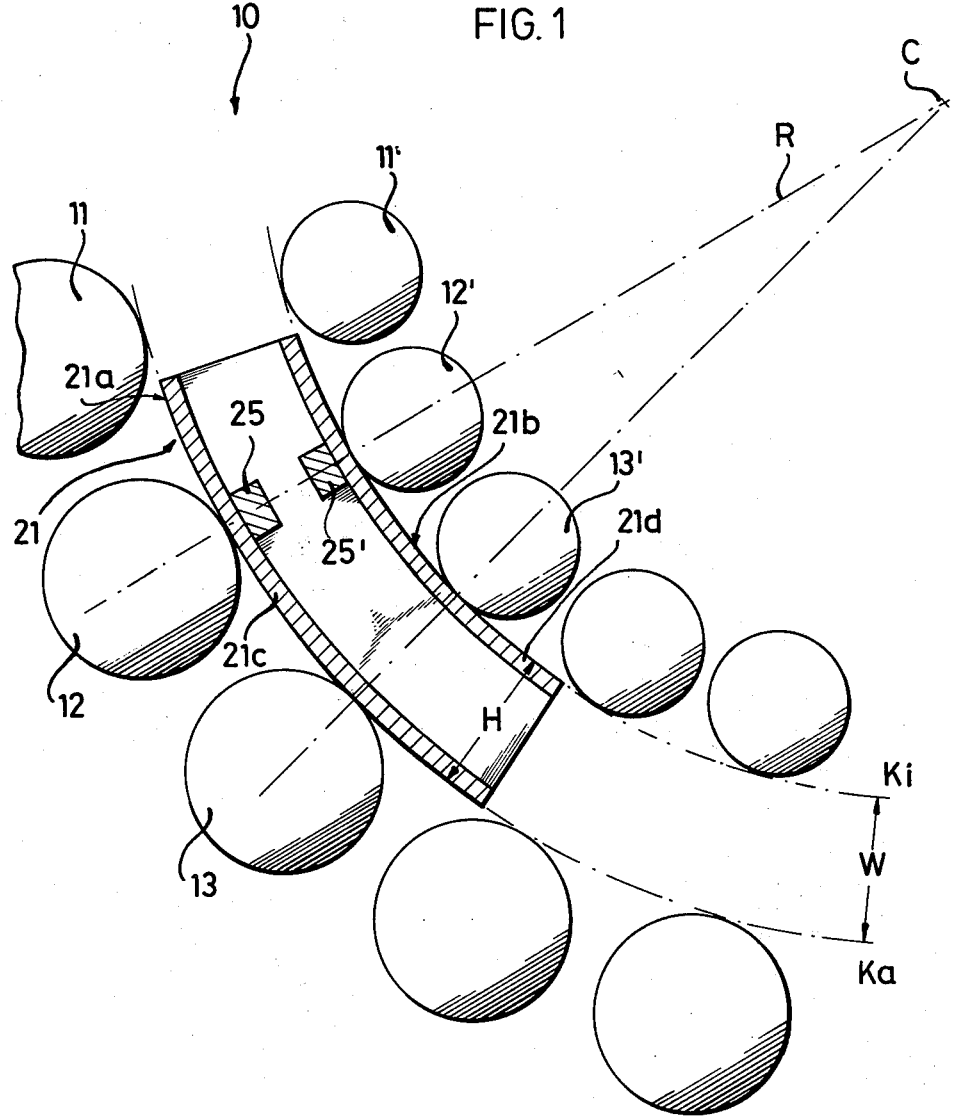
FIG. 1 shows a schematic of a transport track portion with the measuring device inserted, in a sectional view taken along line I—I of FIG. 3.
Figure 2:
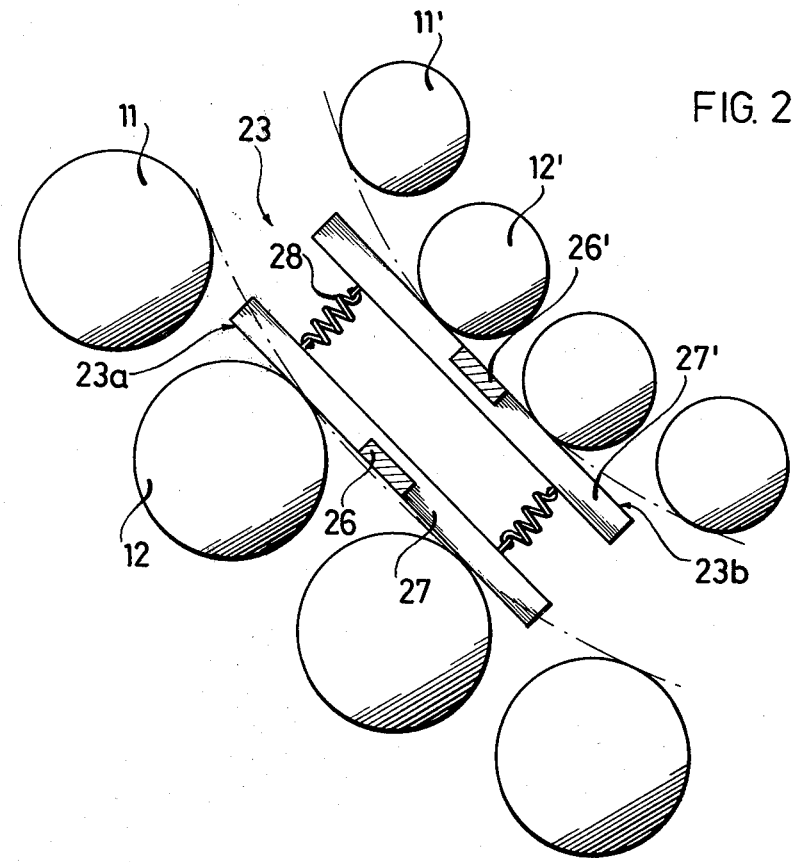
FIG. 2 shows a corresponding section taken along line II—II in FIG. 3.

The curved transport track 10 in FIGS. 1 and 2 is formed by successive sets of rollers 11, 11', 12, 12' which are located the same track width W apart on radii issuing from the center of curvature, C.

The transport track 10 is usually traveled by the continuous casting.

Figure 3:
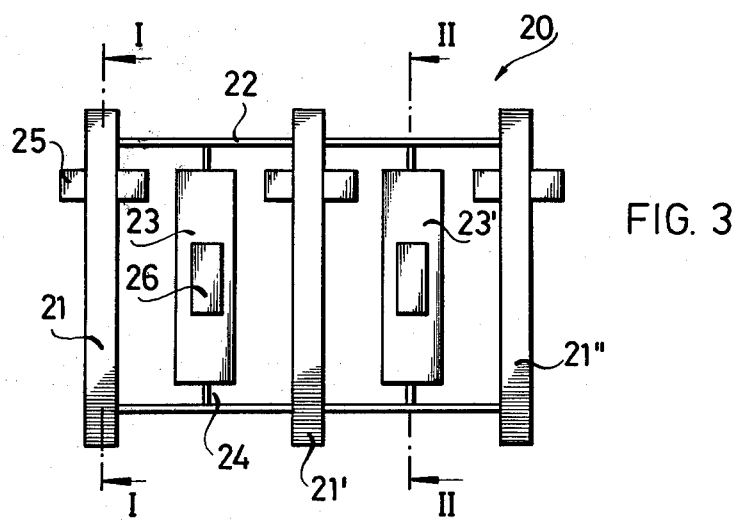
FIG. 3 shows a top view of the schematic of the measuring device.

To check the given track width W, the measuring device 20 in FIG. 3 is placed on the transport track 10 and moved along this track.

The measuring device 20 shown in FIG. 3 comprises three curved bars 21, 21' and 21" (FIG. 3) which are connected by rods 22, and two bars 23, 23' with plane surfaces 23a, 23b. These are located between the curved bars 21, 21', 21". The bars 23, 23' are connected to device 10 via tension elements 24.

The effective surfaces 21a, 21b of curved bars 21, 21', 21" are shaped with the curvature radii Ki and Ka. The height H of bars 21, 21', 21", including the elastically resilient coat 21c, 21d, corresponds to the given track width W of transport tracks 10 or the opening between roller sets 11, 11'; 12, 12' which form the transport track 10.

Along the path of a radius R, the bars 21, 21', 21" are each assigned two displacement pickups or sensors 25, 25' at a distance determined by the track distance W.

The displacement pickups, to check the track width, permit regulating the axial position and camber of the rollers.

Between bars 21, 21', 21" for the displacement pickups, bars 23, 23' for two inclinometers 26, 26' are located.

Part of the bars 23, 23' are independently movable support surfaces 27, 27' with an inclinometer 26 or 26' associated with each. These support surfaces engage in alternate (reciprocal) action with the roller sets forming the transport track.

The effective surface 23a, 23b of supporting surfaces 27, 27' contacts the rollers of the transport track 10. These rollers are under an initial load 28.

By means of the inclinometers it is possible to check the roller position on the curvature and the relative position of the transport track segments to each other. In addition, it is possible to determine when the rollers are out of round (out of true).

The measuring device provides virtually all pertinent information on the state of the transport track in a speedy manner.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A measuring device for checking the dimensional accuracy of the track width of curved transport tracks formed by paired rollers lying on a radius of curvature equidistantly from each other at elevated temperatures, comprising:
    (A) carrier means placeable into a transport track and moveable along the transport track, said carrier means including:
        (a) a plurality of latterally spaced elongated members, each of said members having a height corresponding to the track width, a length providing continuous spanning of at least two successive roller pairs when said members are placed in said transport track, and contours corresponding at least approximately to the curvature of the transport track;
        (b) connecting means extending intermediate each of said elongated members to interconnect said members one to the other; and
        (c) bar means intermediate said elongated members and connecting means for permitting the carrier means to have a height reducible by external effects;
    (B) at least two displacement sensing means on at least one of said members and spaced apart at a distance dependent on the track width, said displacement sensing means being located on a radius of the circle of curvature of said track and continuously at a perpendicular orientation to said curved transport track when moving along said track on said carrier means for checking the dimensional accuracy of the track width perpendicular to said curved transport track.

2. The measuring device as defined in claim 1, wherein, said displacement sensing means comprising non-contact sensing means.

3. The measuring device as defined in claim 1, wherein said elongated members have surface portions in reciprocal engagement with the rollers, said members having a coating of elastically resilient material on at least said surface portions in reciprocal engagement with the rollers.

4. The measuring device as defined in claim 1, wherein said sensing means comprises further a plurality of paired displacement sensors distributed over the width of the device.

5. The measuring device as defined in claim 1, including at least one inclinometer.

6. The measuring device as defined in claim 5, wherein said bar means include at least two spaced parallel bars with at least one inclinometers mounted on each of said bars.

7. The measuring device as defined in claim 5, wherein said bar means include two spaced parallel inclinometer carrier bars with independently movable surface portions in reciprocal engagement with facing rollers of said transport track, each of said carrier bars having a length providing continuous spanning of only two successive roller pairs when placed in said transport track under an initial tension; and inclinometers associated with said independently movable surface portions.

8. The measuring device as defined in claim 1, wherein said carrier means has a height dependent on the width of said track, said displacement sensing means comprising non-contact sensing means; said elongated members having surface portions in reciprocal engagement with the rollers, with a coating of elastically resilient material on at least said surface portions in reciprocal engagement with the rollers; said displacement sensing means comprising pairs of displacement sensors distributed over the width of said device; said bar means including an inclinometer carrier bar with independently movable surface portions in reciprocal engagement with facing rollers of the transport track, said carrier bar having a length spanning continuously only two successive roller pairs when placed in the transport track under an initial tension, said inclinometers being associated with said surface portions.

9. The measuring device as defined in claim 3, wherein said displacement sensing means comprises a plurality of displacement pairs of sensors distributed over the width of said device.

* * * * *